Patented Nov. 21, 1933

1,936,044

UNITED STATES PATENT OFFICE 1,936,044

LAMINATED PRODUCT AND METHOD OF PRODUCING SAME

James F. Walsh, East Orange, N. J., assignor to Celluloid Corporation, a corporation of New Jersey No Drawing. Application November 24, 1928
Serial No. 321,763

10 Claims. (Cl. 49—81)

This invention relates to the production of laminated articles and particularly to the manufacture of laminated glass by the use of a plastic composition containing a derivative of cellulose.

An object of my invention is to produce laminated products having therein a layer of plastic composition containing derivatives of cellulose, which layer is of substantial uniform thickness.

A further object of my invention is to provide a plastic composition containing a derivative of cellulose and sufficient plastifier so that the same is readily flowable under heat and pressure. Further objects of my invention will appear from the following detailed description.

Prior to my invention, laminated glass has been made by interposing thin sheets of a hard composition containing cellulose nitrate or pyroxylin between sheets of glass, and causing the same to unite by heat and pressure. These thin sheets of cellulosic material were quite rigid and tended to lose their volatile solvents, with the result that even when volatile solvents were applied to assist the union of the cellulosic sheets with the glass, great difficulty was experienced in causing firm adherence, even when great heat and pressure were applied. Moreover with the use of thin hard sheets of a composition containing derivative of cellulose, the laminated glass is of irregular thickness and has irregular stresses due to the tendency of the cellulosic sheet not to flow sufficiently.

I have found that the above described difficulties of poor welding and irregularities of the product may be obviated by employing as a laminating agent, a plastic composition containing derivatives of cellulose, which composition has a soft consistency resembling that of a rubber-like mass.

In accordance with my invention, I prepare a plastic composition containing a derivative of cellulose, sufficient non-volatile solvents or plastifiers to impart to the finished product such plasticity that it will readily flow under heat and pressure and a volatile solvent. If desired, stabilizers, such as urea, and dyes, preferably of a violet hue, may be added to the plastc mixture.

The cellulose derivative that may be employed in making up the plastic composition may be cellulose nitrate or organic derivatives of cellulose such as organic esters of cellulose and cellulose ethers. Examples of organic esters are cellulose acetate, cellulose formate, cellulose propionate and cellulose butyrate. Examples of cellulose ethers are ethyl cellulose, methyl cellulose and benzyl cellulose. A mixed ester such as cellulose acetonitrate may also be used.

Any suitable relatively non-volatile solvent or plastifier may be employed. Examples of these are dibutyl phthalate, diethyl phthalate, dibutyl tartrate, and triacetin. If desired, fire retardants such as tricresyl phosphate or triphenyl phosphate may be used.

Examples of suitable volatile solvents are ethyl alcohol, preferably denatured, methyl alcohol, acetone or benzene or mixtures of these.

The plastic mass is worked up in any suitable manner into sheets or other shapes and pieces of the same are inserted between layers of glass or other material to be laminated. The layers of glass may if desired, be previously coated with an adhesive or cementing agent, such as gelatin. In order to secure uniformity of thickness of the sheet of plastic composition to be formed, sufficient space is allowed between the pieces of plastic composition, to permit the same to flow together when heat and pressure are applied. The glass and the cellulosic material are then caused to unite by the application of the requisite heat and pressure.

In one form of my invention, a plastic composition is made as follows:—

| | Parts by weight |
|---|---|
| Cellulose nitrate (pyroxylin) | 100 |
| Dibutyl phthalate | 50–75 |
| Urea (stabilizer) | 1 |

These are combined by the addition of a volatile solvent such as ethyl alcohol, and the mass is then worked up on heated malaxating rolls to drive off a large percentage of volatile solvent. The sheets thus formed are stacked, blocked and sheeted, or planed to desired thickness and allowed to cure, age or dry to remove as much volatile solvent as possible. Because of the comparatively large amount of plastifier employed, the sheets are more or less permanently plastic, and flow readily under heat and pressure. If the layer of pyroxylin composition to be formed in the laminated glass is to be comparatively thin, the higher proportion of dibutyl phthalate or other plastifier will be used. By varying the amount of plastifier, the thinness to which sections of the resulting mass may be pressed may be varied.

The sheets as described may be employed for making the laminated glass and may be of any desired thickness. In general, I have found that sheets of $\frac{1}{16}$ of an inch in thickness give satisfactory results. The sheets of this thickness may be cut up into pieces of an area of, say, 4 square inches, and are placed between layers of glass, which have preferably been coated with an adhesive cementing material, such as gelatin. The pieces of pyroxylin material are placed at such distances apart, that when heat and pressure are applied, they will flow and amalgamate to form a continuous layer of the uniform thickness desired, say, for example, a thickness of .020 inches. The pressure may be applied by heated hydraulic presses.

If it is desired to employ cellulose acetate instead of cellulose nitrate, in making the plastic composition, the following mixture may be employed.

| | Parts by weight |
|---|---|
| Cellulose acetate | 100 |
| Triacetin | 60 | together with a volatile solvent, which may be acetone or a mixture of acetone and ethyl or methyl alcohol. Here again the amount of triacetin or plastifier will be varied in accordance with the thinness to which the sheets are to be pressed.

The laminated glass thus formed, comprises two or more layers of glass having between them one or more sheets of plastic composition containing a derivative of cellulose of uniform thickness, free of imperfections and local stresses, and well stuck to the glass. Such laminated glass when struck a blow, does not shatter, since the pieces of glass adhere firmly to the pyroxylin sheet. The percentages as given in the claims are based on the weight of the cellulose derivative present in the composition.

It is to be understood that the foregoing detailed description is given merely by way of illustration and that many variations may be made therein, without departing from the spirit of this invention.

Having described my invention, what I claim and desire to secure by Letters Patent is:

1. Laminated glass having sheets of glass united by a plastic composition containing a derivative of cellulose and 50–75%, based on the cellulose derivative, of non-volatile plastifier selected from the group consisting of dibutyl phthalate, diethyl phthalate, dibutyl tartrate and triacetin to render the same flowable under heat and pressure.

2. Laminated glass having sheets of glass united by a plastic composition containing cellulose nitrate and 50–75%, based on the cellulose nitrate, of non-volatile plastifier selected from the group consisting of dibutyl phthalate, diethyl phthalate, dibutyl tartrate and triacetin to render the same flowable under heat and pressure.

3. Laminated glass having sheets of glass united by a plastic composition containing a derivative of cellulose and 50 to 75%, based on the cellulose derivative, of a non-volatile plastifier selected from the group consisting of phthalic acid esters.

4. Laminated glass having sheets of glass united by a plastic composition containing cellulose acetate and 50 to 75%, based on the cellulose acetate, of a non-volatile alkyl phthalate.

5. The method of making a laminated glass, comprising interposing layers of a plastic composition containing a derivative of cellulose and 50–75%, base on the cellulose derivative, of non-volatile plastifiers selected from the group consisting of dibutyl phthalate, diethyl phthalate, dibutyl tartrate and triacetin to render the same flowable under heat and pressure between sheets of glass to be laminated, and then causing the plastic mass to coalesce under heat and pressure.

6. The method of making laminated glass, comprising interposing layers of a plastic composition containing a derivative of cellulose and 50 to 75%, based on the cellulose derivative, of non-volatile plastifiers selected from the group consisting of phthalic acid esters.

7. The method of making laminated glass, comprising interposing layers of a plastic composition containing cellulose acetate and 50 to 75%, based on the cellulose acetate, of a non-volatile alkyl phthalate.

8. The method of making a laminated glass comprising interposing layers of a plastic composition containing cellulose nitrate and 50–75%, based on the cellulose nitrate, of non-volatile plastifiers selected from the group consisting of dibutyl phthalate, diethyl phthalate, dibutyl tartrate and triacetin to render the same flowable under heat and pressure between sheets of glass to be laminated, and then causing the plastic mass to coalesce under heat and pressure.

9. Method of preparing laminated glass comprising interposing between sheets of glass non-contiguous pieces of plastic composition containing derivatives of cellulose and 50–75%, based on the cellulose derivative, of plastifier selected from the group consisting of dibutyl phthalate, diethyl phthalate, dibutyl tartrate and triacetin to render the same flowable under heat and pressure, and then applying sufficient heat and pressure to cause coalescence of the plastic composition into a continuous layer.

10. Method of preparing laminated glass comprising interposing between sheets of glass non-contiguous pieces of plastic composition containing cellulose nitrate and 50–75%, based on the cellulose nitrate, of plastifier selected from the group consisting of dibutyl phthalate, diethyl phthalate, dibutyl tartrate and triacetin to render the same flowable under heat and pressure, and then applying sufficient heat and pressure to cause coalescence of the plastic composition, into a continuous layer.

JAMES F. WALSH.